United States Patent [19]
Isenberg

[11] 3,770,026
[45] Nov. 6, 1973

[54] APPARATUS AND METHOD FOR ACCURATELY LOADING SYRINGES

[76] Inventor: Joel Saul Isenberg, 9485 E. Orchard Dr., Englewood, Colo. 80110

[22] Filed: Sept. 17, 1971

[21] Appl. No.: 181,448

[52] U.S. Cl. .................... 141/2, 33/1 V, 73/425.6, 128/218 C, 141/27, 141/94
[51] Int. Cl. .... B65b 1/16, A61m 5/18, B65b 31/08
[58] Field of Search ............................ 141/2, 27, 94; 33/1 V; 73/425.4 P, 425.6; 128/218 C

[56] References Cited
UNITED STATES PATENTS

| | | | |
|---|---|---|---|
| 3,578,037 | 5/1971 | Flynn | 141/2 |
| 1,736,392 | 11/1929 | Coss | 141/27 |
| 3,417,904 | 12/1968 | McLay | 128/218 C |
| 3,602,272 | 8/1971 | Stawski | 141/27 |
| 2,375,711 | 5/1945 | Vondrak | 128/218 C |
| 2,739,591 | 3/1956 | Yochem | 128/218 C |
| 2,888,015 | 5/1959 | Hunt | 128/218 C |

FOREIGN PATENTS OR APPLICATIONS

| | | | |
|---|---|---|---|
| 363,901 | 8/1906 | France | 128/218 C |

*Primary Examiner*—Wayne A. Morse, Jr.
*Attorney*—Cushman et al.

[57] ABSTRACT

A gage set is provided for loading various types of conventional hypodermic syringes. The gages comprise, in a first embodiment, a member having opposed parallel faces displaced from one another by a perpendicular edge having a notch formed therein which is sized to receive the plunger shaft of the syringe. This member may be formed as a single unit or of a number of smaller units which are fastened together to create the desired displacement. To load a syringe using the first embodiment the plunger is gradually withdrawn by pushing with the member until the member slips over the plunger shaft and then the plunger is pushed in until the member is trapped between and engages the barrel flange and the plunger disk. In a second embodiment the gage comprises a hollow member having a closed end and an open end defined by a lip to be parallel to the closed end, said open end being adapted to receive the plunger disk but not the barrel flange of the syringe. In the use of the second embodiment, the open end is slipped over the plunger disk which is in an extended position following the filling of the syringe with an approximate amount of medicine. Then the member is pressed until the lip engages the barrel flange. In a third embodiment the gage is composed of a member similar to the first embodiment but with a gap or notch essentially parallel to the opposed parallel faces to receive the plunger disk thus requiring minimal manual dexterity to use. The gage in any embodiment may contain indicia of the make and model of syringe with which it should only be used, the amount of medication which it will load, and further may be color coded for type of medication.

10 Claims, 5 Drawing Figures

PATENTED NOV 6 1973 3,770,026

INVENTORS
JOEL S. ISENBERG

BY Cushman, Darby & Cushman
ATTORNEYS

APPARATUS AND METHOD FOR ACCURATELY LOADING SYRINGES

SUMMARY OF THE INVENTION

1. Field of the Invention

This invention relates to volume stops used with hypodermic syringes which allow the syringe to be accurately and consistently filled to a selected volume or volumes without use of the volume indicia from the barrel surface of the syringe.

2. Description of the Prior Art

Numerous devices limit the amount of travel allowed a plunger into the barrel of a syringe but these dosage limiting devices mostly require either the modification of the syringe with which they are used or a rigid attachment of the device to a particular syringe. As an example of a device requiring syringe modification the patent to Helmer et al., U.S. Pat. No. 2,875,761 issued Mar. 3, 1959 employs specially notched plunger shaft portions which cooperate with a detent attached to the barrel. The selection of loading volumes is limited in this type by the closeness with which the notches can be discretely spaced on the plunger shaft, and its employment requires visual acuity or a good sense of touch together with extreme care on the part of the user to determine the actual setting of the syringe during loading. Other patents such as the patent to Hill, U.S. Pat. No. 3,237,660 issued Mar. 1, 1966 show completely modified syringes which accomplish loading control. However, this type of syringe must be present to one or two loading volumes using the volume indicia imprinted on the barrel of the syringe which requires visual acuity, and hence limits its applicability to reusable syringes which can be used repeatedly with the same setting. Furthermore, both types of modified syringes would entail additional costs over the conventional syringe which puts them at a competitive disadvantage.

The prior art does show stopping devices which do not require modification of the syringe itself, for example the patents to Yochem, U. S. Pat. Nos. 2,739,588; 2,739,589; 2,739,590; 2,739,591 all issued Mar. 27, 1956. However, these patents all involve devices which must be rigidly clamped to portions of the syringe and then adjusted or calibrated using the volume indicia printed on the barrel of the syringe. They are thus not suitable for use with disposable syringes as they would need be clamped and set each time on each new syringe which obviously offers no advantage over the straightforward use of the conventional syringe by itself. The patents to Fletcher, U.S. Pat. No. 2,216,354 issued Oct. 1, 1940 and to Truesdale, U.S. Pat. No. 2,215,882 issued June 27, 1950 also require fixed attachment of a device to the syringe components, but act primarily to stop the movement of the plunger within the barrel towards the needle end so that it is not possible to use these devices to accurately load a syringe. In addition, with respect to the Truesdale patent at least, it appears that the plunger shaft thereof would have to be removed from the barrel and the collar inserted thereover which is undesirable in view of the non-cylindrical shape of many plunger shafts.

It is extremely desirable to accomplish accurate, consistent, and quick loading control for conventional disposable hypodermic syringes which are widely available at low gradations in volume settings, which allows a mixed dosage of two or more types of medication to be loaded in a single syringe, and which even people with limited visual acuity or manual dexterity can use. None of the devices in the prior art meet these requirements for one or more of the reasons discussed above.

SUMMARY OF THE INVENTION

It is the object of the applicant's invention to overcome the deficiencies of the prior art by applying to a conventional disposable or reusable syringe a gage which allows the syringe to be quickly and accurately loaded to a selected volume or volumes with either a single or a mixed dosage without regard to the indicia displayed on the barrel thereof. A set of such gages independently calibrated for each particular make of mass produced dimensionally identical syringes covers the range of volumes with fine gradations, each gage being marked with large readily visible indicia of volume or units of medication. The applicant's invention overcomes any errors in calibration in mass produced disposable syringes which are identical dimensionally but have inaccurately placed volume indicia on the barrel. The invention generally enables any user to load a disposable syringe with less chance of error due to misreading of the volume indicia, with higher consistency and accuracy, more quickly, and with less fatique than when loading in the conventional manner. Furthermore, the invention permits the independent use of conventional disposable syringes by persons with problems of visual acuity prevalent for example in diabetics, allowing them to select and vary their dosage of medication and to load mixed dosages. Thus the invention has utility for a wide class of users, including persons such as diabetics and allergy patients who inject their own medication, professionals such as registered nurses who daily load and use many syringes with a variety of medication, and laboratory workers who make repeated rapid injections.

The applicant accomplishes these results through the use of an independently calibrated member having opposed parallel ends and an edge spacing the ends apart by such a distance that, when the opposed ends are engaged with the barrel flange and plunger disc of a conventional syringe, an appropriate amount of medication is contained with the barrel of the syringe.

In a first embodiment the member has a notched edge which receives the plunger shaft and this member may be a composite of smaller units which are releasably connected together. In another embodiment a hollow member may have a first open end defined by a lip and a second closed end parallel to the first end and spaced apart by the edge of the member. The open end of the member is sized to receive the plunger disc but not the barrel flange so that the second embodiment is utilized by pressing the hollow member over the plunger disc until it engages the barrel flange at which time an appropriate amount of medication is contained within the plunger.

BRIEF DESCRIPTION OF THE DRAWINGS

The preferred embodiments of the applicant's invention will now be described with reference to the drawings in which.

DETAILED DESCRIPTION OF THE PREFERRED EMBODIMENT

Figure 1:
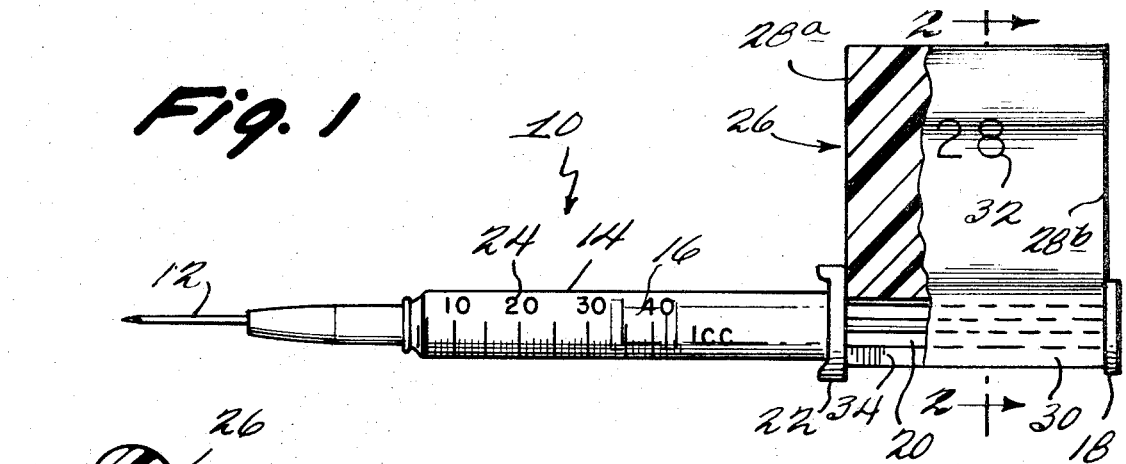
FIG. 1 shows a conventional syringe using a gage in accord with a first embodiment of the applicant's invention.

Referring to FIG. 1, the reference numeral 10 indicates, in general, a conventional syringe. Syringe 10 comprises a needle 12 which communicates with the interior of barrel 14 to allow medication to be taken into the barrel when plunger 16 which is slidably mounted in sealing engagement with the interior of the barrel 14 is withdrawn to a position as shown in FIG. 1.

Plunger 16, in turn, is manipulated by plunger head or disc 18 which is attached to plunger by plunger shaft 20. Medication may be ejected through needle 12 by pressing plunger disc so as to move the shaft 20 into the barrel 14. The barrel 14 includes as a conventional structural feature a fixed axially facing surface which in the illustrated embodiment is the surface of a flange 22.

Normally the amount of medication drawn into the barrel is determined by inspection of the liquid level vis-a-vis indicia 24 formed upon the exterior of the barrel surface, barrel 14 being formed of transparent material. As discussed above, indicia 24 are frequently inaccurate indicators of volume and are of little aid to a poorly sighted person in loading an appropriate dosage. Therefore, the applicant proposes the use of a gage 26 having parallel ends 28a and 28b between the facing sides of barrel flange 22 and plunger disc 18 as an aid in loading syringe 10. The end 28a defines a forward stop surface for engagement with the flange 22, and the end 28b defines a rear stop surface for engaging with the forward end surface of the plunger head. Ends 28a and 28b of gage 26 are separated by an edge 30 which is appropriately dimensioned with respect to barrel 14 so that barrel 14 contains the desired amount of medication when the plunger disc 18 and barrel flange 22 thereof are spaced apart by the length of edge 30. The gage is appropriately numbered in large sized print 32 to designate the size of dosage which it corresponds to in the same units appearing as indicia 24, and gage 26 may, in addition, be color coded to indiciate the type of medication with which it should be used. Where conventional colors exist as, for example, the color green for u-80 insulin, these colors should be adopted. Furthermore, gage 26 may also be marked to denote the particular make and model of syringe with which the gage should be used.

Figure 2:
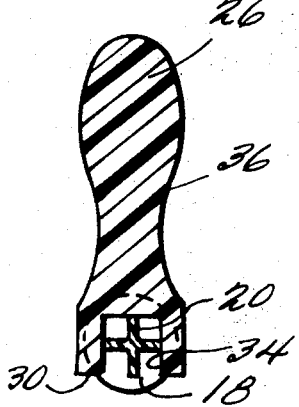
FIG. 2 is an end view of a gage in accord with the first embodiment of the applicant's invention taken along line 2 — 2 in FIG. 1.

As can best be seen in FIG. 2, the gage 26 includes a cavity in the form of a groove or notch 34 axially disposed along the edge which is sized to receive plunger shaft 20. Furthermore, as shown in FIG. 2, the sides 36 of gage 26 may be desirably curved inwardly to accept the fingers of an operator, and while gage 26 is preferably made of a dimensionally stable material such as metal or plastic, the edges of sides 36 may be grooved, etched, or covered with another material to present a no slip surface. It is also desirable that at least some of the information discussed above which is to be placed upon the gage 26 in standard printed form should be formed in raised letters or in Braille letters so that a blind person can use the gage without help.

Figure 3:
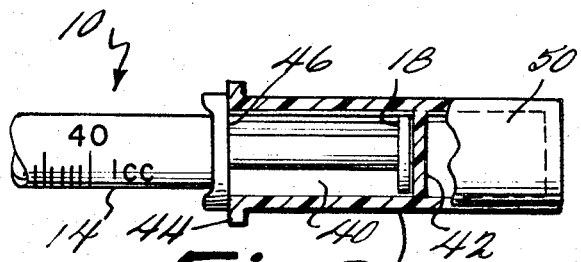
FIG. 3 is a partial side view of a conventional syringe utilizing a second embodiment of the applicant's invention.

Turning to FIG. 3, a second embodiment of the applicant's invention is shown which comprises a member 40 having a cylindrical cavity therein. The cavity has an open end 46 surrounded by a lip 44 which is parallel to the closed end 42 of the cavity. Open end 46 is sized to receive without interference plunger disc 18 of syringe 10 and to engage barrel flange 22. And the perpendicular side wall or edge 48 of member 40 has a length with respect to barrel 14 so that barrel 14 contains the desired amount of medication when the plunger disc 18 and barrel flange 22 thereof are spaced apart by the length of edge 48. An appropriate handle for gage 40 is provided by extending edge 48 thereof beyond closed end 42 to form handle 50. Of course, gage 40 should be marked as described above with respect to the first embodiment.

The mode of operation with each of the above described embodiments is nearly identical. In each case the needle 12 is inserted into a bottle of medication and both are held in a vertical position with the bottle of medication inverted. The plunger is then withdrawn from the barrel flange to draw an amount of medication into barrel 14 exceeding the prescribed dosage. Then, in the case of the first embodiment notch 34 of gage 26 is slipped over plunger shaft 20 and plunger disc 18 is pressed toward barrel flange 22 until the rear stop surface 28b of the gage 26 abuts with the forward end surface of the plunger disc 18 and until the forward stop surface 28a of the gage 26 abuts with the surface of the flange 22. In the second embodiment, open end 46 of gage 40 is slipped over plunger disc 18 until plunger disc engages opposed end 42 and then by means of handle 50 gage 40 is pressed towards barrel flange 22 until the lip 44 thereof engages the barrel flange. Then, in either embodiment, the gage is removed and the syringe 10 is ready to inject the prescribed dosage.

Figure 4:
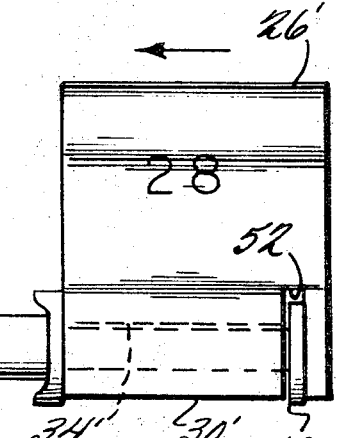
FIG. 4 shows a third embodiment of the applicant's invention.

FIG. 4 shows another embodiment which is similar to the first embodiment except that a gage 26' includes a slot 52 which is formed perpendicular to notch 34' and which has end walls engageable with the forward and rear end surfaces of the plunger disc 18. The operation of gage 26' is essentially identical to that of the operation of gage 26 with the exception that when the plunger disc is being withdrawn from the barrel during loading, the edge of plunger disc 18 may be inserted partially into slot 52 so that when the required dose or slightly more than the required dose has been drawn into barrel 14 of syringe 10, gage 26 will noticeably snap inward so that notch 34' thereof engages plunger shaft 20. In other words, the modification of FIG. 4 requires less manual dexterity than does the embodiment of FIG. 1 and is even better suited for the use by poorly sighted persons. Of course, gage 26' should be marked and colored as gage 26.

Figure 5:
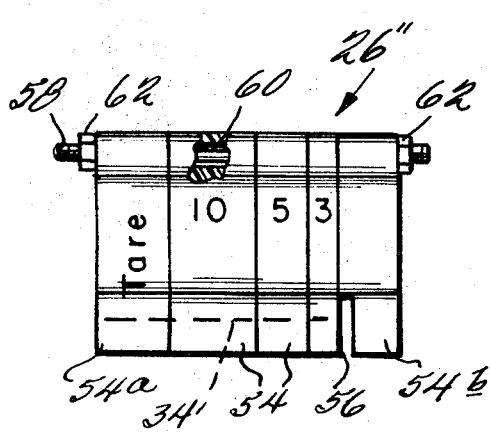
FIG. 5 shows a fourth kind of embodiment of the applicant's invention.

While the discussion thus far has centered upon a single unitary type of gage, a gage set comprising a plurality of modular components may more desirably be formed which can be placed together in composite to form gages representing a variety of desired displacement. Thus, for example, referring to FIG. 5, gage 26" is formed from a plurality of units 54. Units 54 may be formed in sizes corresponding to 2, 3, 5 and 10 units along the barrel or in other useful combinations, and each unit 54 includes fastening means for quickly connecting it to its neighboring units. In addition, a tare or zero unit such as 54a should be included to compensate for the distance between plunger disc 18 and barrel flange 22 which exists when plunger 16 is at its minimum distance from needle 12. In addition, one of the units 54, for example unit 54b, may include a notched portion 56 which acts as the stop 52 described above with respect to the embodiment of FIG. 4. In FIG. 5, units 54 are connected together by means of the rod 58 which connects in register the apertures 60 formed through the portions of units 54 opposite the edge portions thereof. The edge portions of units 54 contain notches 34' which, when units 54 are placed in register by rod 58, are, similarly, placed in register. Once the rod 58 has been placed through an appropriate number of units 54 fasteners 62 are added at each outer end thereof to complete the unit.

Finally, the mode of operation so far discussed has centered on the loading of a single type of medication in a given syringe. One of the considerable advantages of the first, third, and fourth embodiments described above is that they may be used to load a syringe accurately with two or more types of medication. For example one type of medication is first loaded in the manner previously described in the first embodiment. Next a gage member in the first embodiment is selected which corresponds to the sum of the first dosage loaded and the second dosage to be loaded. Then the notch 34 of gage 26 is partially slipped over the plunger shaft 20 and the end 28b of the gage 26 is pressed against the plunger disc 18 forcing withdrawal of the plunger shaft until the gage 26 just fits between the barrel flange 22 and the plunger disc 18. The procedure for loading a multiple dosage with the third embodiment is essentially identical to that described above with the exception that the edge of the plunger disc 18 is inserted partially into slot 52 when the plunger disc is being withdrawn from the barrel during loading.

While the above descriped embodiments exemplify the applicant's invention, modifications may be made to these embodiments within the scope of the invention. For example, while the gage 26 is shown with concave sides, it may have another cross sectional shape. Therefore, to acertain the scope of the applicant's invention reference must be made to the following claims.

What is claimed is:

1. A gage for use in loading a predetermined volume of medication into a disposable hypodermic syringe of the type including a plunger shaft terminating at its outer end in an enlarged head having forward and rear end surfaces which face axially of the shaft and a barrel having a fixed surface which faces toward the forward face of said head, said gage comprising a member having a forward end surface and having a longitudinal dimension and a transverse dimension, said member having opposite side surfaces of substantial area facing transversely of the longitudinal dimension of the member to thereby provide a handle to be gripped by the fingers of the person using said gage, said member also having two parallel stop surfaces lying in said transverse dimension and arranged in spaced apart relationship along said longitudinal dimension of said member, one of said stop surfaces forming a portion of said forward end surface of said members, so that when said member is disposed in its operative position with its longitudinal dimension parallel to the plunger of a syringe said one stop surface is engageable with the fixed surface on the syringe barrel and the other stop surface is engageable with one of the end surfaces of the plunger head, the distance between said stop surfaces when so engaged determining the longitudinal position of the plunger within the barrel.

2. A gage for use in loading a predetermined volume of medication into a disposable hypodermic syringe of the type including a plunger shaft terminating at its outer end in an enlarged head having forward and rear end surfaces which face axially of the shaft and a barrel having a fixed surface which faces toward the forward face of said head, said gage comprising a member having a longitudinal dimension and a transverse dimension, said member having opposite side surfaces of substantial area facing transversely of the longitudinal dimension of the member to thereby provide a handle to be gripped by the fingers of the person using said gage, said member also having two parallel stop surfaces lying in said transverse dimension and arranged in spaced apart relationship along said longitudinal dimension of said member, said member having a cavity extending longitudinally of said member between said stop surfaces for receiving the plunger of the syringe, so that when said member is disposed in its operative position with its longitudinal dimension parallel to the plunger of a syringe one of said stop surfaces is engageable with the fixed surface on the syringe barrel and the other stop surface is engageable with one of the end surfaces of the plunger head, the distance between said stop surfaces when so engaged determining the longitudinal position of the plunger within the barrel.

3. A gage as in claim 2 wherein said cavity is a bore within said member, said bore having an open end adjacent said one stop surface, the other end of said bore defining said other stop surface whereby in the operative position of said gage said other stop surface is engageable with the rear end surface of the plunger head.

4. A gage as in claim 2 wherein said cavity is a groove extending longitudinally of said member between said stop surfaces.

5. A gage as in claim 2 wherein said member has a slot lying in a plane which is transverse to the longitudinal dimension of said member, said slot having end walls which are engageable with the forward and rear surfaces of the plunger head when said member is in its operative position, said cavity in said member being a longitudinally extending groove which communicates at one end of said slot.

6. A gage as in claim 5 wherein said member is made up of a plurality of similarly shaped units disposed end-to-end engagement and further including means for releasably holding said units together.

7. In combination with a disposable hypodermic syringe of the type including a plunger shaft terminating at its outer end in an enlarged head having forward and rear end surfaces which face axially of the shaft and a barrel having a fixd surface which faces axially toward the forward face of said head, a gage for use in loading a predetermined volume of medication into said syringe, said gage having a forward end surface and having a longitudinal dimension and a transverse dimension and comprising a member having opposite side surfaces of substantial area facing transversely of said longitudinal dimension to thereby provide a handle to be gripped by the person using said gage, said member also having two parallel stop surfaces lying in said transverse dimension, one of said stop surfaces forming a portion of said forward end surface of said gage, said stop surfaces being so arranged in spaced apart relationship along said longitudinal dimension that, when said gage is disposed in its operative position with its longitudinal dimension parallel to said syringe plunger, that said one stop surface is engageable with said fixed surface on said syringe barrel and the other stop surface is engageable with one of said end surfaces of said plunger head, the distance between said stop surfaces determining the longitudinal position of said plunger within said barrel and hence determining the volume of medication to be dispensed from said barrel.

8. The combination of claim 7 wherein said member has a cavity extending along the longitudinal dimension of said member between said stop members, said syringe plunger residing in said cavity when said gage is in its operative position.

9. A method of loading a predetermined volume of medication into any one of a plurality of mass produced dimensionally identical disposable hypodermic syringes of the type including a plunger shaft terminating at its outer end in an enlarged head having forward and rear end surfaces which face axially of the shaft, a barrel having a fixed surface which faces toward said forward face of said head, and a needle affixed to one end of the barrel, said method comprising: inserting said needle into a source of medication and partially withdrawing said plunger shaft from said barrel to draw medication into said barrel through said needle; manually holding a gage adjacent said plunger shaft, said gage having a forward end surface which can be abutted with said fixed surface on said syringe barrel and having a rear stop surface which can be abutted with one of said end surfaces of said plunger head, the distance between said forward end surface and said rear stop surface having been independently determined for the type of syringe being loaded; moving said plunger shaft into said barrel to a position in which said one end surface of said plunger head abuts said stop surface and in which said forward end surface of the gage abuts said fixed surface on said syringe barrel; and removing the gage whereby the resulting position of said plunger shaft relative to said barrel determines the volume of medication in said barrel.

10. A method as in claim 9 wherein a predetermined volume of a second medication is loaded into the syringe after removing said gage by inserting the needle into a supply of the second medication, abutting one end of a second gage of greater length than the first-mentioned gage with the forward end surface of the plunger head pressing said second gage against said forward end surface to withdraw said plunger shaft further from said syringe barrel and continuing the withdrawal until said second gage just fits between said plunger head and said fixed surface on said barrel.

* * * * *